United States Patent
Oyama et al.

(10) Patent No.: US 9,583,272 B2
(45) Date of Patent: Feb. 28, 2017

(54) ELECTROLYTE SOLUTION FOR ELECTROCHEMICAL DEVICES, ALUMINUM ELECTROLYTIC CAPACITOR, AND ELECTRIC DOUBLE LAYER CAPACITOR

(71) Applicant: SUMITOMO SEIKA CHEMICALS CO., LTD., Hyogo (JP)

(72) Inventors: Shunji Oyama, Hyogo (JP); Noriko Yamamoto, Hyogo (JP); Naoka Hirabayashi, Hyogo (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 242 days.

(21) Appl. No.: 14/385,326

(22) PCT Filed: Feb. 8, 2013

(86) PCT No.: PCT/JP2013/053054
§ 371 (c)(1),
(2) Date: Sep. 15, 2014

(87) PCT Pub. No.: WO2013/145890
PCT Pub. Date: Oct. 3, 2013

(65) Prior Publication Data
US 2015/0076389 A1   Mar. 19, 2015

(30) Foreign Application Priority Data

Mar. 29, 2012 (JP) .................. 2012-075920

(51) Int. Cl.
H01G 9/035 (2006.01)
H01G 11/60 (2013.01)
H01G 9/145 (2006.01)

(52) U.S. Cl.
CPC ............ *H01G 9/035* (2013.01); *H01G 11/60* (2013.01); *H01G 9/145* (2013.01); *Y02E 60/13* (2013.01)

(58) Field of Classification Search
CPC ........... H01M 300/00372; H01M 6/14; H01M 6/16–6/166; H01M 2300/0025–2300/0042; H01M 2300/0037; H01G 11/60; H01G 11/62; H01G 11/58; H01G 9/035
USPC ............................................ 252/62.2, 182.1
See application file for complete search history.

(56) References Cited

U.S. PATENT DOCUMENTS

| 4,167,458 A * | 9/1979 | Louzos | C25D 3/54 205/234 |
| 4,725,927 A | 2/1988 | Morimoto et al. | |
| 4,943,497 A * | 7/1990 | Oishi | H01M 2/34 429/53 |
| 6,274,277 B1 * | 8/2001 | Mori | H01M 2/08 429/307 |
| 2012/0243145 A1 | 9/2012 | Takahashi et al. | |
| 2012/0301992 A1 * | 11/2012 | Chiba | H01G 9/2004 438/64 |

FOREIGN PATENT DOCUMENTS

| CN | 1511327 A | 7/2004 |
| EP | 1 394 824 A1 | 3/2004 |
| JP | 62029077 A * | 2/1987 |
| JP | S62-237715 | 10/1987 |
| JP | S63-012122 | 1/1988 |
| JP | H10-233341 | 9/1998 |
| JP | H11-243037 | 9/1999 |
| JP | 2000-340470 | 12/2000 |
| JP | 2011-14476 A | 1/2011 |
| JP | 2012-056925 | 3/2012 |
| WO | 2011/070925 A1 | 6/2011 |

OTHER PUBLICATIONS

Kolosnitsyn et al., "Cycling a Sulfur Electrode: Effect of Physicochemical Properties of Electrolyte Systems", Nov. 10, 2003, Russian Journal of Electrochemistry, vol. 39, No. 10, pp. 1089-1093.*
Translation of JP 62029077 A abstract from espacenet.com, printed Jul. 14, 2016, 2 pages.*

* cited by examiner

Primary Examiner — Matthew E Hoban
Assistant Examiner — Lynne Edmondson
(74) Attorney, Agent, or Firm — Hamre, Schumann, Mueller & Larson, P.C.

(57) ABSTRACT

The present invention aims to provide an electrolyte solution for electrochemical devices, which has excellent thermal stability and high decomposition voltage and produces a small amount of evaporation at high temperatures. The present invention also aims to provide an aluminum electrolytic capacitor and an electric double layer capacitor, both of which include the electrolyte solution for electrochemical devices. The present invention relates to an electrolyte solution for electrochemical devices, the electrolyte solution including a solvent and an electrolyte, the solvent containing a sulfone compound represented by the formula (1):

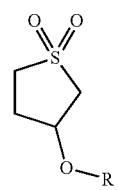

(1)

wherein R represents a $C_{1-6}$ alkyl group.

5 Claims, No Drawings

ELECTROLYTE SOLUTION FOR ELECTROCHEMICAL DEVICES, ALUMINUM ELECTROLYTIC CAPACITOR, AND ELECTRIC DOUBLE LAYER CAPACITOR

TECHNICAL FIELD

The present invention relates to an electrolyte solution for electrochemical devices, which contains a sulfone compound. The present invention also relates to an aluminum electrolytic capacitor and an electric double layer capacitor, both of which include the electrolyte solution for electrochemical devices.

BACKGROUND ART

As electrolyte solutions used for electrochemical devices such as electric double layer capacitors, aqueous electrolyte solutions and non-aqueous electrolyte solutions are known. Non-aqueous electrolyte solutions have more advantages in having a decomposition voltage of 2 to 3 V while aqueous electrolyte solutions have a decomposition voltage of about 1.2 V. In other words, non-aqueous electrolyte solutions have advantages in having a higher withstand voltage than aqueous electrolyte solutions and thus have been rapidly spreading.

Sulfone compounds are generally used as extract solvents and solvents for various reactions. Particularly, sulfone compounds having a high dielectric constant are also used as aprotic polar solvents for non-aqueous electrolyte solutions. Among sulfone compounds, sulfolane, which has a high decomposition voltage, has been widely used as aprotic polar solvents for non-aqueous electrolyte solutions that are used as electrolyte solutions for electrochemical devices and the like.

The following are disclosed examples of electrochemical devices each containing a sulfone compound (e.g. sulfolane) as an aprotic polar solvent for an electrolyte solution: an electric double layer capacitor and an aluminum electrolytic capacitor, both of which include a mixture containing sulfolane or a sulfolane derivative such as 3-methyl sulfolane (Patent Literature 1, Patent Literature 2); an electric double layer capacitor that contains a solvent mixture of sulfolane or a sulfolane derivative (e.g. 3-methyl sulfolane) and propylene carbonate or the like (Patent Literature 3); and an aluminum electrolytic capacitor that contains a solvent mixture of sulfolane and a benzyl alcohol or a derivative thereof (Patent Literature 4).

CITATION LIST

Patent Literature

Patent Literature 1: JP S62-237715 A
Patent Literature 2: JP H11-243037 A
Patent Literature 3: JP S63-12122 A
Patent Literature 4: JP H10-233341 A

SUMMARY OF INVENTION

Technical Problem

Aprotic polar solvents, which are used as solvents for electrolyte solutions that are used for electrochemical devices and the like, are generally required to have a low melting point and excellent thermal stability. Unfortunately, since the sulfone compounds (e.g. sulfolane) disclosed in Patent Literature 1 and 2 have a relatively high melting point, the electrolyte solutions containing such a sulfone compound problematically coagulate under low-temperature environment, which significantly deteriorates the performance of the resulting electrochemical devices. The solvent mixtures of sulfolane and propylene carbonate, benzyl alcohol, or the like, which are disclosed in Patent Literature 3 and Patent Literature 4, have defects such as poor thermal stability and thus fail to have sufficient performance to serve as aprotic polar solvents used as solvents for electrolyte solutions that are used for electrochemical devices or the like. Thus, such solvent mixtures still have room for improvement.

In addition, conventional non-aqueous electrolyte solutions, in which sulfolane or propylene carbonate is used as an aprotic polar solvent, fail to have a sufficiently high oxidation potential. An electrolyte solution with an insufficient oxidation potential may generate gas or cause a reaction product to adhere to electrodes during continuous application of a high voltage higher than 2.5 V, thereby resulting in defects such as an increase in internal resistance and a decrease in capacity. Thus, a solvent for an electrolyte solution with a decomposition voltage sufficiently high to withstand use at a higher voltage, has been desired. In addition, in a conventional solvent for an electrolyte solution for aluminum electrolytic capacitors, which is disclosed in Patent Literature 4, the electrolyte solution evaporates at high temperatures and thereby deteriorates the performance of the resulting electrochemical device.

One of the objects of the present invention is to provide an electrolyte solution for electrochemical devices, which has excellent thermal stability and high decomposition voltage and produces a small amount of evaporation at high temperatures. Another object of the present invention is to provide an aluminum electrolytic capacitor and an electric double layer capacitor, both of which include the electrolyte solution for electrochemical devices.

Solution to Problem

The present invention provides an electrolyte solution for electrochemical devices, the electrolyte solution including a solvent and an electrolyte, the solvent containing a sulfone compound represented by the formula (1).

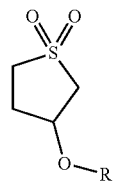

(1)

In the formula (1), R represents a $C_{1-6}$ alkyl group.

The present invention will be described in the following. Through conducting intensive studies, the inventors of the present invention found that dissolving an electrolyte in a solvent that contains a sulfone compound with a specific structure can produce an electrolyte solution for electrochemical devices, which has excellent thermal stability and high decomposition voltage and produces a small amount of evaporation at high temperatures, and thereby completed the present invention.

The electrolyte solution for electrochemical devices of the present invention includes a solvent.

The solvent contains a sulfone compound represented by the formula (1). The sulfone compound represented by the formula (1) has a low melting point and a low vapor pressure. Thus, the electrolyte solution for electrochemical devices of the present invention can have sufficient conductivity at low temperatures and produce a small amount of evaporation at high temperatures. Moreover, containing a sulfone compound represented by the formula (1), the electrolyte solution for electrochemical devices of the present invention can have a wide potential window and high decomposition voltage.

In the formula (1), R represents a $C_{1-6}$ alkyl group. Examples of the $C_{1-6}$ alkyl group represented by R include methyl group, ethyl group, n-propyl group, isopropyl group, n-butyl group, sec-butyl group, isobutyl group, tert-butyl group, and the like. In terms of having excellent thermal stability and high decomposition voltage, methyl group, ethyl group, n-propyl group, and isopropyl group are preferred, and n-propyl group and isopropyl group are more preferred.

Examples of the sulfone compound represented by the formula (1) include 3-methoxysulfolane, 3-ethoxysulfolane, 3-n-propoxysulfolane, 3-isopropoxysulfolane, 3-tert-butoxysulfolane, 3-n-butoxysulfolane, 3-isobutoxysulfolane, and the like. In terms of having excellent thermal stability and high decomposition voltage, 3-methoxysulfolane, 3-ethoxysulfolane, 3-n-propoxysulfolane, and 3-isopropoxysulfolane are preferred.

The sulfone compound represented by the formula (1) may be produced by, for example, the method disclosed in Journal of Organic Chemistry, 26 (11), 4394-4399, (1961). Specifically, the sulfone compound may be produced by reacting 3-sulfolene and an alcohol represented by the formula (2) under heating and stirring in the presence of an alkali.

(2)

In the formula (2), R represents the same group as R in the formula (1), and examples thereof include methyl group, ethyl group, n-propyl group, isopropyl group, n-butyl group, sec-butyl group, isobutyl group, tert-butyl group, and the like. Among these, methyl group, ethyl group, n-propyl group, and isopropyl group are preferred, and n-propyl group and isopropyl group are more preferred.

The alcohol represented by the formula (2) may be a commercially available alcohol.

The preferable lower limit of the amount of the alcohol represented by the formula (2) is 0.8 mol, the preferable upper limit thereof is 5.0 mol, the more preferable lower limit thereof is 1.0 mol, and the more preferable upper limit thereof is 3.5 mol, per mole of 3-sulfolene. In the case where the alcohol is used also as a solvent, the amount thereof may exceed the above upper limits. The alcohol is preferably used also as a reaction solvent in the present invention.

Examples of the alkali include sodium hydroxide, potassium hydroxide, and the like. Potassium hydroxide is suitably used in terms of operability and the like.

The preferable lower limit of the amount of the alkali is 0.01 mol, the preferable upper limit thereof is 1.0 mol, the more preferable lower limit thereof is 0.08 mol, and the more preferable upper limit thereof is 0.12 mol, per mole of 3-sulfolene.

The reaction temperature of the reaction of 3-sulfolene and an alcohol represented by the formula (2) is preferably 30° C. to 60° C. The reaction time is usually 12 to 48 hours.

The sulfone compound represented by the formula (1) obtained through the above process may be washed with water, separated, and then isolated by distillation according to need.

The melting point of the sulfone compound represented by the formula (1) is preferably 30° C. or lower for securing stable operation of the electrochemical device at low temperatures.

The exothermic onset temperature of the sulfone compound represented by the formula (1) is preferably 100° C. or higher for allowing the resulting electrolyte solution for electrochemical devices to have excellent thermal stability.

The vapor pressure at 100° C. of the sulfone compound represented by the formula (1) is preferably 20 Pa or lower for suppressing the amount of evaporation of the resulting electrolyte solution for electrochemical devices at high temperatures.

The solvent to be used for the electrolyte solution for electrochemical devices of the present invention may be a sulfone compound represented by the formula (1) alone or may be a solvent mixture of the sulfone compound and another solvent.

Examples of another solvent include propylene carbonate, butylene carbonate, γ-butyrolactone, 1,3-dioxolan, acetonitrile, propionitrile, butyronitrile, dimethyl formamide, 1,2-dimethoxy ethane, ethylmethylsulfone, ethyl isopropyl sulfone, propyl isobutyl sulfone, propyl sec-butyl sulfone, propyl tert-butyl sulfone, isopropyl butyl sulfone, isopropyl isobutyl sulfone, isopropyl sec-butyl sulfone, isopropyl tert-butyl sulfone, butyl isobutyl sulfone, butyl sec-butyl sulfone, isobutyl tert-butyl sulfone, sec-butyl tert-butyl sulfone, butyl tert-butyl sulfone, sec-butyl isobutyl sulfone, propyl isopentyl sulfone, isopropyl isopentyl sulfone, propyl isohexyl sulfone, isopropyl isohexyl sulfone, sulfolane, and the like. In terms of having high decomposition voltage, propylene carbonate, γ-butyrolactone, ethylmethylsulfone, ethyl isopropyl sulfone, and sulfolane are preferably used.

If the sulfone compound represented by the formula (1) and another solvent are combined to be prepared as the solvent used as the electrolyte solution for electrochemical devices of the present invention, the preferable lower limit of the amount of the sulfone compound represented by the formula (1) is 10% by mass, and the preferable upper limit thereof is 70% by mass, relative to the solvent as a whole. If the amount of the sulfone compound represented by the formula (1) is less than 10% by mass, the resulting electrolyte solution for electrochemical devices may coagulate at low temperatures, which is unusable for an electrochemical device. The amount of the sulfone compound represented by the formula (1) is preferably 70% by mass or less in terms of such as increasing the decomposition voltage of the resulting electrolyte solution for electrochemical devices. The more preferable lower limit of the amount of the sulfone compound represented by the formula (1) is 25% by mass, the more preferable upper limit thereof is 50% by mass, and the still more preferable upper limit thereof is 35% by mass.

The electrolyte solution for electrochemical devices of the present invention contains an electrolyte.

Examples of the electrolyte include hexafluorophosphates, tetrafluoroborates, perchlorates, and trifluoroalkyl sulfonates of an alkali metal such as lithium; hexafluorophosphates, tetrafluoroborates, perhydrochlorides, and trifluoroalkyl sulfonates of a tetraalkylammonium or the like; and hexafluorophosphates, tetrafluoroborates, perchlorates, and trifluoroalkyl sulfonates of a tetraphosphate. Among these electrolytes, lithium hexafluorophosphate (LiPF$_6$) and tetraalkylammonium tetrafluoroborate (TEA-BF$_4$) are suitably used.

These electrolytes may be used alone or in combination of two or more thereof.

Examples of the tetraalkylammonium include triethylmethylammonium, tetraethylammonium, tetrabutylammonium, diethyldimethylammonium, ethyltrimethylammonium, dimethylpyrrolidinium, diethylpyrrolidinium, ethylmethylpyrrolidinium, spiro-(1,1')-pyrrolidinium, N-methyl-N-spiro pyrrolidinium, diethylpiperidinium, and spiro-(1,1')-piperidinium.

The preferable lower limit of the concentration of the electrolyte in the electrolyte solution for electrochemical devices of the present invention is 0.1 mol/L, and the preferable upper limit thereof is 2.0 mol/L. A concentration of the electrolyte of lower than 0.1 mol/L may prevent the resulting electrolyte solution for electrochemical devices from securing sufficient conductivity and the like, thereby deteriorating the electrical characteristics of the resulting electrochemical device. A concentration of the electrolyte of higher than 2.0 mol/L may increase the viscosity of the resulting electrolyte solution for electrochemical devices, thereby deteriorating the electrical characteristics of the resulting electrochemical device. The more preferable lower limit of the concentration of the electrolyte is 0.6 mol/L, and the more preferable upper limit thereof is 1.2 mol/L.

The electrolyte solution for electrochemical devices of the present invention may further include various additives such as stabilizers for improving the electrochemical performance and the like.

In the electrolyte solution for electrochemical devices of the present invention, a lower viscosity allows the resulting electrochemical device to have a lower internal resistance. Thus, the viscosity of the electrolyte solution, measured at 20° C. with a digital viscometer DVH-EII (TOKYO KEIKI INC.), is preferably 20 mPa·s or less.

Examples of the electrochemical device containing the electrolyte solution for electrochemical devices of the present invention include aluminum electrolytic capacitors, lithium primary batteries, lithium secondary batteries, lithium-ion batteries, fuel cells, solar cells, and electric double layer capacitors. Particularly, aluminum electrolytic capacitors and electric double layer capacitors are preferred.

An aluminum electrolytic capacitor and an electric double layer capacitor, both of which include the electrolyte solution for electrochemical devices of the present invention are also aspects of the present invention.

The aluminum electrolytic capacitor may be any kind of aluminum electrolytic capacitor. One example is the one produced by the following process. Strip-shaped aluminum foil with high purity is chemically or electrochemically etched to increase the surface area. The aluminum foil with the increased surface area is immersed in a chemical conversion solution such as an aqueous solution of ammonium borate to be subjected to chemical conversion coating. Thereby, anode foil in which the surface of the foil has been coated with an oxide film layer is prepared. Separately, cathode foil, in which aluminum foil with high purity has been processed to have an increased surface area in the same manner as in the above, is prepared. The anode foil and the cathode foil are wound having a separator inserted therebetween to form a capacitor element. The capacitor element is impregnated with the electrolyte solution for electrochemical devices of the present invention and accommodated in a bottomed cylindrical aluminum case. The aperture of the aluminum case is then sealed with a sealer.

The electric double layer capacitor may be any electric double layer capacitor, and examples thereof include an electric double layer capacitor that essentially includes a negative electrode, a positive electrode, and the electrolyte solution for electrochemical devices of the present invention. A preferred mode is one in which an electrode element consisting of a positive electrode and a negative electrode faced to each other is impregnated with the above electrolyte solution.

Advantageous Effects of Invention

The present invention can provide an electrolyte solution for electrochemical devices, which has excellent thermal stability and high decomposition voltage and produces a small amount of evaporation at high temperatures. The present invention can also provide an aluminum electrolytic capacitor and an electric double layer capacitor, both of which include the electrolyte solution for electrochemical devices.

DESCRIPTION OF EMBODIMENTS

The present invention will be described in detail referring to, but not limited to, examples.

Production of 3-methoxysulfolane (MOSN)

A 100-mL four-necked flask equipped with a stirrer, a thermometer, a dropping funnel, and a condenser was purged with nitrogen. Methanol (14.0 g (0.44 mol)) and potassium hydroxide (1.23 g (0.02 mol)) were placed in the flask and the mixture was stirred at room temperature for 30 minutes. Then, 3-sulfolene (25.9 g (0.22 mol)) was added to the mixture, and the resulting mixture was heated to 40° C. and stirred at 40° C. to 50° C. for 48 hours. Next, the mixture was cooled to room temperature and neutralized with 35% by mass of an aqueous solution of hydrochloric acid. Methanol was removed by distillation under reduced pressure, and then toluene (13.1 g) and a saturated sodium chloride aqueous solution (89.4 g) were added to the resulting product to cause phase separation. The resulting solution was distilled under reduced pressure to remove toluene from the organic layer and water, whereby 3-methoxysulfolane (15.8 g) was obtained. The yield of the resulting 3-methoxysulfolane was 53% relative to the amount of 3-sulfolene, and the purity by gas chromatography was 99.0%.

The resulting 3-methoxysulfolane was identified by the following physical properties.

$^1$H-NMR (400 MHz, solvent: CDCl$_3$): 4.20 (tt, j=4.0 Hz, 4.0 Hz, 1H), 3.36 (s, 3H), 3.23 to 3.20 (m, 3H), 3.12 to 3.01 (m, 1H), 2.42 to 2.37 (m, 2H)

$^{13}$C-NMR (400 MHz, solvent: CDCl$_3$): 76.7, 56.9, 56.3, 49.5, 29.0

Production of 3-ethoxysulfolane (EOSN)

A 200-mL four-necked flask equipped with a stirrer, a thermometer, a dropping funnel, and a condenser was purged with nitrogen. Ethanol (74.6 g (1.62 mol)) and potassium hydroxide (4.89 g (0.09 mol)) were placed in the flask. The resulting mixture was stirred at room temperature for 30 minutes, and then 3-sulfolene (94.8 g (0.80 mol)) was added to the mixture. The mixture was heated to 40° C. and stirred at 40° C. to 50° C. for 48 hours. The mixture was cooled to room temperature and neutralized with 35% by mass of an aqueous solution of hydrochloric acid. Next, ethanol was removed by distillation under reduced pressure, and then toluene (50.7 g) and a saturated sodium chloride aqueous solution (121.0 g) were added to the resulting product to cause phase separation. The resulting solution was distilled under reduced pressure to remove toluene from the organic layer and water, whereby 3-ethoxysulfolane (96.8 g) was obtained. The yield of the resulting 3-ethoxysulfolane was 74% relative to the amount of 3-sulfolene, and the purity by gas chromatography was 99.6%.

The resulting 3-ethoxysulfolane was identified by the following physical properties.

$^1$H-NMR (400 MHz, solvent: CDCl$_3$): 4.30 (tt, j=3.6 Hz, 4.0 Hz, 1H), 3.51 (q, j=7.2 Hz, 6.8 Hz, 7.2 Hz, 2H), 3.26 to 3.07 (m, 4H), 2.39 to 2.37 (m, 2H), 1.22 (s, j=6.8 Hz, 3H)

$^{13}$C-NMR (400 MHz, solvent: CDCl$_3$): 74.8, 64.8, 56.7, 49.7, 29.5, 15.3

Production of 3-isopropoxysulfolane (IPOS)

A 200-mL four-necked flask equipped with a stirrer, a thermometer, a dropping funnel, and a condenser was purged with nitrogen. Isopropanol (109.0 g (1.94 mol)) and potassium hydroxide (5.10 g (0.09 mol)) were placed in the flask and the mixture was stirred at room temperature for 30 minutes. Then, 3-sulfolene (107.2 g (0.91 mol)) was added to the flask, and the resulting mixture was heated to 40° C. and stirred at 40° C. to 50° C. for 48 hours. The mixture was cooled to room temperature and neutralized with 35% by mass of an aqueous solution of hydrochloric acid. Isopropanol was removed by distillation under reduced pressure. Toluene (50.3 g) and a saturated sodium chloride aqueous solution (105.0 g) were added to the resulting product to cause phase separation. The resulting solution was distilled under reduced pressure to remove toluene from the organic layer and water, whereby 3-isopropoxysulfolane (131.7 g) was obtained. The yield of the resulting 3-isopropoxysulfolane was 82% relative to the amount of 3-sulfolene, and the purity by gas chromatography was 96.6%.

The resulting 3-isopropoxysulfolane was identified by the following physical properties.

$^1$H-NMR (400 MHz, solvent: CDCl$_3$): 4.38 (tt, j=4.0 Hz, 4.4 Hz, 1H), 3.66 (sep, j=6.0 Hz, 1H), 3.28 to 3.23 (m, 2H), 3.13 to 3.06 (m, 2H), 2.34 to 2.33 (m, 2H), 1.17 (d, j=6.0 Hz, 6H)

$^{13}$C-NMR (400 MHz, solvent: CDCl$_3$): 72.2, 70.4, 57.3, 49.9, 30.2, 22.7, 22.2

The melting points and the exothermic onset temperatures of the 3-methoxysulfolane (MOSN), 3-ethoxysulfolane (EOSN), and 3-isopropoxysulfolane (IPOS) were measured with a differential scanning calorimeter under a nitrogen atmosphere.

Table 1 shows the measurement results of the melting points, exothermic onset temperatures, and vapor pressures at 100° C. of the resulting compounds, along with those of propylene carbonate (PC) and sulfolane (SN).

TABLE 1

| | Compound name | Melting point (° C.) | Exothermic onset temperature (° C.) | Vapor pressure (Pa) (100° C.) |
|---|---|---|---|---|
| Sulfone compound represented by the formula (1) | MOSN | −39 | 449 | 7.2 |
| | EOSN | 28 | 118 | 2.9 |
| | IPOS | 14 | 171 | 2.1 |
| Other solvents | PC | −49 | 73 | 371 |
| | SN | 29 | 210 | 36.4 |

Table 1 indicates that 3-methoxysulfolane (MOSN), 3-ethoxysulfolane (EOSN), and 3-isopropoxysulfolane (IPOS), each of which is a sulfone compound represented by the formula (1), each have a lower melting point than sulfolane (SN) and better thermal stability than propylene carbonate (PC). Table 1 also indicates that 3-methoxysulfolane (MOSN), 3-ethoxysulfolane (EOSN), and 3-isopropoxysulfolane (IPOS), each of which is a sulfone compound represented by the formula (1), each have a lower vapor pressure at 100° C. than sulfolane (SN) and propylene carbonate (PC) and thus are deemed to produce a small amount of evaporation at high temperatures.

Examples 1 to 7, Comparative Examples 1 and 2

A solvent was prepared according to Table 2 that shows the materials and the formulation. The electrolyte shown in Table 2 was dissolved in the prepared solvent, where the concentration of the electrolyte was adjusted to the value shown in Table 2. Thus, an electrolyte solution for electrochemical devices was obtained.

<Evaluation>

(Specific Resistance)

The specific resistances of the electrolyte solutions for electrochemical devices obtained in the examples and the comparative examples were measured with LCR HiTESTER 3532-50 (HIOKI E.E. CORPORATION). Table 2 shows the results.

TABLE 2

| | Composition of solvent (% by mass) | | | | Electrolyte | | Specific resistance (Ω · cm) | |
|---|---|---|---|---|---|---|---|---|
| | Sulfone compound represented by the formula (1) | | | Another solvent | | Concentration | | |
| | MOSN | EOSN | IPOS | SN | Type | (mol/L) | −20° C. | 20° C. |
| Example 1 | — | — | 87 | 13 | LiPF$_6$ | 1.0 | 19281 | 328 |
| Example 2 | — | — | 67 | 33 | LiPF$_6$ | 1.0 | 5382 | 195 |
| Example 3 | — | — | 30 | 70 | LiPF$_6$ | 1.0 | 804 | 84 |
| Example 4 | — | 87 | — | 13 | LiPF$_6$ | 1.0 | 6000 | 196 |
| Example 5 | 100 | — | — | — | LiPF$_6$ | 1.0 | 8521 | 221 |

TABLE 2-continued

| | Composition of solvent (% by mass) | | | | Electrolyte | | Specific resistance (Ω · cm) | |
|---|---|---|---|---|---|---|---|---|
| | Sulfone compound represented by the formula (1) | | | Another solvent | | Concentration | | |
| | MOSN | EOSN | IPOS | SN | Type | (mol/L) | −20° C. | 20° C. |
| Example 6 | — | 100 | — | — | LiPF$_6$ | 1.0 | 27473 | 409 |
| Example 7 | — | — | 100 | — | LiPF$_6$ | 1.0 | 9730 | 245 |
| Comparative Example 1 | — | — | — | 100 | LiPF$_6$ | 1.0 | Coagulated | 50 |
| Comparative Example 2 | — | — | — | 100 | TEA-BF$_4$ | 0.6 | Coagulated | 37 |

As shown in Table 2, the electrolyte solutions for electrochemical devices obtained in Examples 1 to 7 could give specific resistance values at −20° C. while the electrolyte solutions for electrochemical devices obtained in Comparative Examples 1 and 2, which were produced only from sulfolane, coagulated at −20° C. and thus gave no specific resistance values. These results indicate the effect that even a solvent (e.g. sulfolane) that has no conductivity by itself at low temperatures can provide sufficient conductivity at low temperatures if the solvent is mixed with a sulfone compound represented by the formula (1).

In addition, the electrolyte solution for electrochemical devices of Example 3, which contained 30% by mass of the sulfone compound represented by the formula (1), provided a sufficiently low specific resistance value at −20° C. and a specific resistance value that is favorable and similar to that of Comparative Example 1 at 20° C.

Thus, the electrolyte solution for electrochemical devices of the present invention, which contains a sulfone compound represented by the formula (1), can provide sufficient conductivity in a wide temperature range.

(Potential Window)

The oxidation potentials and the reduction potentials of the electrolyte solutions for electrochemical devices produced in the examples and the comparative examples were measured, whereby the potential windows thereof were determined.

The measurement device was a potentiogalvanostat (BAS Inc.). A glassy carbon electrode (electrode outer diameter: 6 mm, electrode size: 1.6 mm) as a working electrode and a platinum electrode (length: 5.7 cm, diameter of platinum: 0.5 mm) as a counter electrode were used. A silver/silver ion electrode having acetonitrile/tetrabutylammonium perchlorate as an inner solution was placed in a cell as a reference electrode for the solvent system. Each of the electrolyte solutions for electrochemical devices obtained in the examples and the comparative examples was separately charged in the cell. The oxidation potential and the reduction potential of each solution were measured at a potential scan rate of 5 mV/s by linear sweep voltammetry (LSV) (potential window was evaluated based on 1000 μA/cm$^2$). Table 3 shows the results.

TABLE 3

| | Reduction potential (V vs Ag/Ag$^+$) | Oxidation potential (V vs Ag/Ag$^+$) | Potential window (V) |
|---|---|---|---|
| Example 1 | −3.7 | 2.6 | 6.3 |
| Example 2 | −3.6 | 4.2 | 7.8 |
| Example 3 | −3.5 | 4.1 | 7.6 |
| Example 4 | −3.7 | 2.8 | 6.5 |
| Example 5 | −3.3 | 3.6 | 6.9 |
| Example 6 | −3.6 | 3.1 | 6.7 |
| Example 7 | −3.9 | 4.4 | 8.3 |
| Comparative Example 1 | −3.5 | 2.9 | 6.4 |
| Comparative Example 2 | −3.4 | 2.8 | 6.2 |

The results shown in Table 3 indicate the following. The electrolyte solutions for electrochemical devices of Examples 1 to 7 each had a higher oxidation potential and a comparable reduction potential and thus had a wider potential difference (potential window) between the oxidation potential and the reduction potential, compared with the electrolyte solutions of Comparative Examples 1 and 2. This means that the electrolyte solutions for electrochemical devices of the examples had high decomposition voltage. Particularly, the electrolyte solutions for electrochemical devices produced in Examples 2, 3, and 5 to 7 each had an extremely higher oxidation potential than those produced in Comparative Examples 1 and 2. Accordingly, the electrolyte solutions for electrochemical devices of Examples 2, 3, and 5 to 7 can be used at higher voltage.

INDUSTRIAL APPLICABILITY

The present invention provides an electrolyte solution for electrochemical devices, which has excellent thermal stability and high decomposition voltage and produces a small amount of evaporation at high temperatures. The present invention also provides an aluminum electrolytic capacitor and an electric double layer capacitor, both of which include the electrolyte solution for electrochemical devices.

The invention claimed is:

1. An electrolyte solution for electrochemical devices, the electrolyte solution comprising:

a solvent; and an electrolyte, the solvent being a mixed solvent comprising sulfolane and a sulfone compound represented by the formula (1):

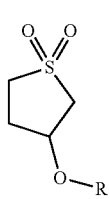 (1)

wherein R represents a $C_{1-6}$ alkyl group.

2. The electrolyte solution for electrochemical devices according to claim 1,
wherein the R in the formula (1) represents a methyl group, ethyl group, n-propyl group, or isopropyl group.

3. The electrolyte solution for electrochemical devices according to claim 1,
wherein the solvent contains 10 to 70% by mass of the sulfone compound represented by the formula (1).

4. An aluminum electrolytic capacitor comprising the electrolyte solution for electrochemical devices according to claim 1.

5. An electric double layer capacitor comprising the electrolyte solution for electrochemical devices according to claim 1.

* * * * *